US012729990B2

(12) United States Patent
Bolger et al.

(10) Patent No.: US 12,729,990 B2
(45) Date of Patent: Sep. 8, 2026

(54) BUBBLE DETECTION

(71) Applicant: Analog Devices International Unlimited Company, Limerick (IE)

(72) Inventors: Eoin Seamus Bolger, County Kilkenny (IE); Suleyman Hanayli, Istanbul (TR)

(73) Assignee: Analog Devices International Unlimited Company, Limerick (IE)

(*) Notice: Subject to any disclaimer, the term of this patent is extended or adjusted under 35 U.S.C. 154(b) by 380 days.

(21) Appl. No.: 18/171,146

(22) Filed: Feb. 17, 2023

(65) Prior Publication Data

US 2024/0280392 A1 Aug. 22, 2024

(51) Int. Cl.
*G01F 1/74* (2006.01)
*G01N 27/333* (2006.01)

(52) U.S. Cl.
CPC ............ *G01F 1/74* (2013.01); *G01N 27/333* (2013.01)

(58) Field of Classification Search
CPC ................................ G01F 1/74; G01N 27/333
See application file for complete search history.

(56) References Cited

U.S. PATENT DOCUMENTS

| | | | | |
|---|---|---|---|---|
| 10,942,163 | B1 * | 3/2021 | Krasnow | G01N 1/28 |
| 2015/0346143 | A1 * | 12/2015 | Gover | G01N 27/4163 205/792 |
| 2018/0239662 | A1 * | 8/2018 | Meusel | G06F 16/2477 |
| 2018/0322941 | A1 * | 11/2018 | Krishnan | G16H 10/40 |

FOREIGN PATENT DOCUMENTS

| | | |
|---|---|---|
| WO | 2023213415 | 11/2023 |
| WO | 2023213417 | 11/2023 |

* cited by examiner

*Primary Examiner* — C. Sun
(74) *Attorney, Agent, or Firm* — Schwegman Lundberg & Woessner, P.A.

(57) ABSTRACT

The present disclosure provides a software-based approach for detecting bubbles in a fluid channel of a sensor system. According to this approach, readings from sensors which measure chemical characteristics of a sample fluid (e.g. ion concentrations of the sample fluid) are analysed. Any anomalous readings can be detected and analysed to determine whether the anomalous readings may be caused by the presence of one or more bubbles in the fluid channel. This approach removes the need to include additional conductivity sensors in the sensor system to detect bubbles, thereby freeing up sensor electrode sites which may be used for other sensors (e.g. additional calcium ion sensors). Bubbles that are detected can be shifted, or removed from the fluid channel entirely, by pumping fluid into the fluid channel.

15 Claims, 7 Drawing Sheets

BUBBLE DETECTION

TECHNICAL FIELD

The present disclosure relates to the detection of bubbles in sensor systems.

BACKGROUND

Extracorporeal sensor systems extract samples of bodily fluids (e.g. blood) from a subject in order to perform measurements on the sample fluid. The sample fluid may be passed through a fluid channel where the sensors are positioned. During this process, air bubbles may be introduced into the fluid channel. If an air bubble is close to a sensor, the accuracy of measurements from the sensor may be affected, which is undesirable.

The presence of bubbles in a sensor system may be detected using conductivity sensors positioned in the fluid channel. A fall in a conductivity value output from the conductivity sensors may be interpreted as being caused by one or more bubbles in the fluid channel. However, this approach may require the conductivity sensors to be added to the sensor system as additional sensors, which may not otherwise be required.

SUMMARY OF INVENTION

The present disclosure provides a software-based approach for detecting bubbles in a fluid channel of a sensor system. According to this approach, readings from sensors which measure chemical characteristics of a sample fluid (e.g. ion concentrations of the sample fluid) are analysed. Any anomalous readings can be detected and analysed to determine whether the anomalous readings may be caused by the presence of one or more bubbles in the fluid channel. This approach removes the need to include additional conductivity sensors in the sensor system to detect bubbles, thereby freeing up sensor electrode sites which may be used for other sensors (e.g. additional calcium ion sensors). Bubbles that are detected can be shifted, or removed from the fluid channel entirely, by pumping fluid into the fluid channel.

According to an aspect of the present disclosure, there is provided a processing system for use with a sensor system comprising a plurality of sensors arranged along a fluid channel. The processing system comprises one or more processors configured to: receive readings from each sensor of the plurality of sensors; and determine, based on identifying an anomaly in the readings received from at least one of the plurality of sensors, whether one or more bubbles are present in the fluid channel of the sensor system.

According to another aspect of the present disclosure, there is provided a system comprising a sensor system comprising a fluid channel and a plurality of sensors arranged along the fluid channel. The system further comprises a processing system comprising: a plurality of anomaly detectors, each of the anomaly detectors being configured to receive readings from a respective sensor of the plurality of sensors and output a signal indicative of whether an anomaly is present in the readings; and a bubble detector configured to receive the signals output from the anomaly detectors and determine, based on the signals, whether anomalies in the readings are caused by one or more bubbles in the fluid channel.

According to another aspect of the present disclosure, there is provided a computer readable medium comprising instructions which, when executed by one or more processors, cause the one or more processors to receive readings from each sensor of a plurality of sensors arranged along a fluid channel of a sensor system; and determine, based on identifying an anomaly in the readings received from at least one of the plurality of sensors, whether one or more bubbles are present in the fluid channel of the sensor system.

According to another aspect of the present disclosure, there is provided a method of processing data from a plurality of sensors arranged along a fluid channel of a sensor system. The method comprises receiving readings from each sensor of the plurality of sensors; and determining, based on identifying an anomaly in the readings received from at least one of the plurality of sensors, whether one or more bubbles are present in the fluid channel of the sensor system.

BRIEF DESCRIPTION OF THE DRAWINGS

The present disclosure will now be described by way of example only with reference to the accompanying drawings, wherein like reference numerals refer to like parts, and in which.

DETAILED DESCRIPTION

The present disclosure describes a processing system capable of detecting a bubble (for example, an air bubble) that is present in fluid that is held within a fluid channel of a sensor system. The processing system utilises readings obtained from the sensors of the sensor system to perform the detection process.

In some cases, the presence of one or more bubbles in the fluid channel can be verified by pumping fluid into the fluid channel. Further sensor readings can then be taken to confirm that the anomalous readings have disappeared, indicating that the bubbles have moved, or are no longer present in the fluid channel. This approach may provide a straightforward means of detecting bubbles in the sensor system without the need for any additional hardware (e.g. additional sensors specifically arranged to detect bubbles in the fluid channel).

Figure 1:
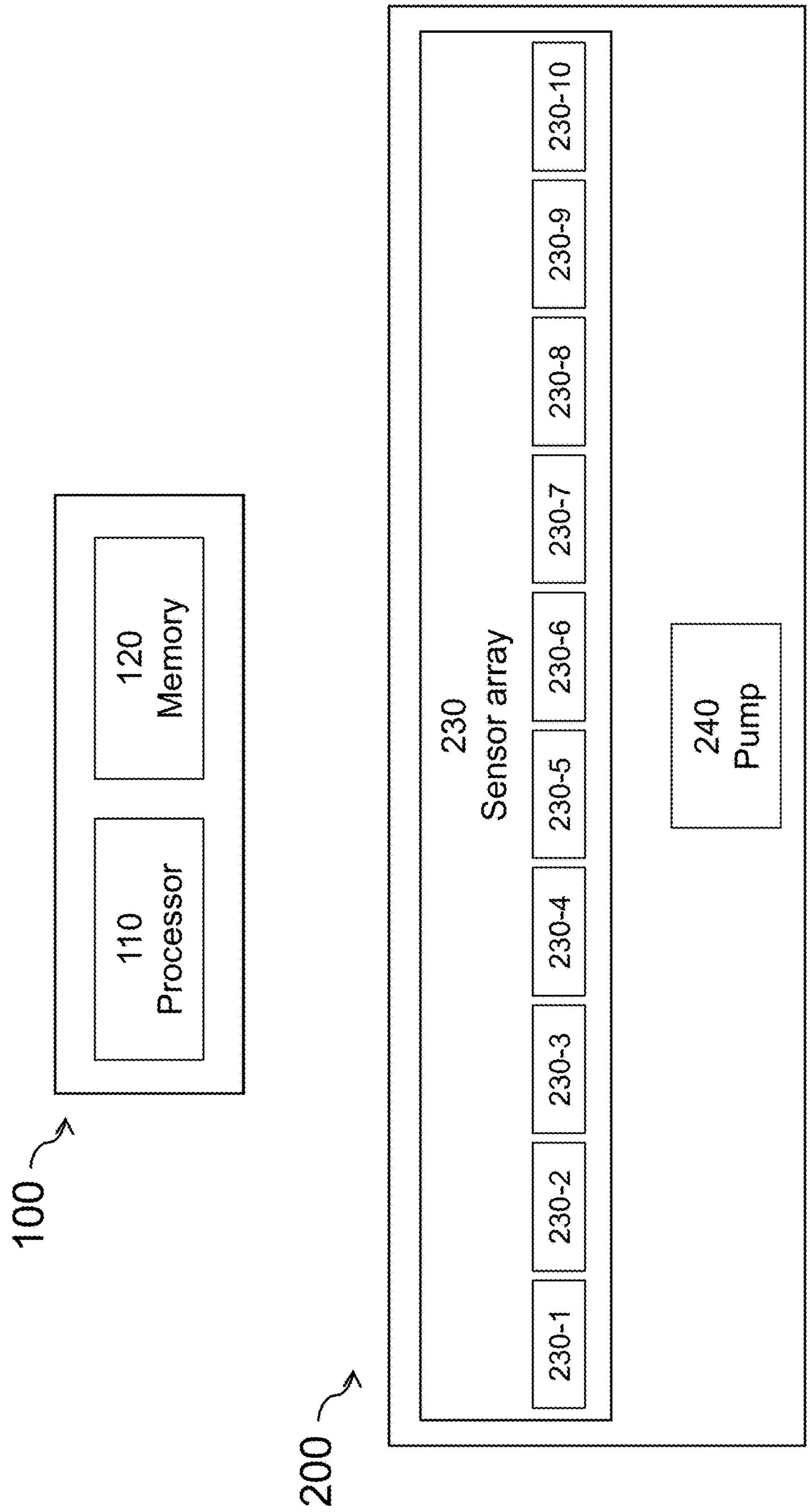
FIG. 1 shows an example of a system according to the present disclosure.

FIG. 1 shows an example system according to the present disclosure. Specifically, FIG. 1 shows a block diagram of a system including a processing system 100 and a sensor system 200 according to example embodiments of the present disclosure.

The processing system 100 includes a processor 110 and memory 120. In the example shown in FIG. 1, one processor 110 is provided. In other examples, multiple processors that are operatively connected may be used. The processing system 100 can be configured to perform any of the data processing operations described herein.

In the example system shown in FIG. 1, the processing system 100 and the sensor system 200 are separate systems which are communicatively connected to each other (e.g. via a wired connection or a wireless network). In other examples, the processing system 100 and the sensor system 200 may be implemented together in a single unit.

The sensor system 200 includes a sensor array 230 which includes multiple sensors 230-1 to 230-10. These sensors 230-1 to 230-10 are arranged along a fluid channel (not shown) and in use are exposed to fluid which is present in the fluid channel. In the present example, ten sensors are provided, however other numbers of sensors may be used.

Each of the sensors 230-1 to 230-10 is configured to measure a chemical characteristic (e.g. ion concentration) of a sample fluid (e.g. blood) which is present in the fluid channel in use. For example, the sensors 230-1 to 230-10 may include one or more of a calcium ion sensor, a potassium ion sensor, a sodium ion sensor, and a pH sensor. In some examples, at least one of the sensors 230-1 to 230-10 is an ion selective electrode (ISE).

The sensor system 200 also includes a pump 240 which is configured to pump fluid (e.g. a calibration fluid, or blood) into the fluid channel of the sensor system 200. The pump 240 may pump fluid in response to a control signal, e.g. a control signal generated by the processor 110 of the sensor system 100.

The processor 110 is configured to receive readings from each of the sensors 230-1 to 230-10. The processor 110 is configured to detect anomalies in the readings from the sensors. An anomalous reading from a sensor may be, for example, a reading that results in an output value from a component that relays readings from sensor to the processor reaching the maximum or minimum possible output value of the component. An example of such a component is an amplifier, such as an operational amplifier.

Based on the identification of anomalies in the sensor readings, data associated with the anomalous readings (e.g. times associated with the anomalous readings) and location data associated with the two or more sensors (e.g. relative locations of the sensors along the fluid channel), the processor 110 can determine whether one or more bubbles are present in the fluid channel. This will be explained in more detail below.

The processor 110 may be configured to perform a predetermined action in response to determining that one or more bubbles are present in the fluid channel. For example, the processor 110 may generate an alert signal which may be transmitted to a display (not shown) in order to display an alert message to a user. This provides the user with a visual indication that a bubble is present.

In some examples, the processor 110 may be configured to transmit a control signal to the pump 240 of the sensor system to pump fluid (e.g. calibration fluid or blood) through the fluid channel in response to determining that one or more bubbles are present in the fluid channel. This should result in the bubbles being flushed out of the fluid system, thus stopping the bubbles from affecting the accuracy of the sensor measurements. The control signal may cause the pump 240 to alter the flow rate of the fluid flowing through the fluid channel. This may help to dislodge bubbles which are stuck at a certain position in the fluid channel.

The processor 110 may determine an amount of fluid to be pumped through the fluid channel based on an estimate of the locations of the one or more bubbles in the fluid channel. The location of the bubbles may be estimated by the processor 110 based on the locations of the sensors 230-1 to 230-10 in the fluid channel. For example, if the processor 110 determines that the bubble is close to the first sensor 230-1 or the second sensor 230-2, which are close to the downstream end of the fluid channel, the processor may transmit a control signal which activates the pump 240 for a relatively short amount of time which results in a small amount of fluid (e.g. 20% to 40% of the fluid channel volume) being pumped through the fluid channel. This should be sufficient to clear the bubble from the fluid channel, whilst minimising the amount of fluid required to flush the bubble. This may be particularly desirable when the fluid in the fluid channel is calibration fluid, since typically only a limited amount of calibration fluid is available to the sensor system 200.

Alternatively, or in addition, the processor 110 may determine an amount of fluid to be pumped through the fluid channel based on the type of fluid which is currently held within the fluid channel. For example, if the fluid held within the fluid channel is a sample fluid (which may be available in large quantities), then the processor 110 may transmit a control signal which activates the pump 240 for a relatively long amount of time, which results in all of the sample fluid (i.e. 100% of the fluid channel volume) being flushed out of the fluid channel. This will increase the certainty that any bubbles in the sample fluid have been removed.

The processor 110 can be any general-purpose processor configured to execute a set of instructions. For example, one or more processors can be one or more general-purpose microprocessors, one or more field programmable gate array (FPGA), and/or one or more application specific integrated circuits (ASIC). The processor 110 is communicatively connected to the memory 120 via a bus (not shown).

The memory 120 can be a random-access memory (RAM), a read-only memory (ROM), a persistent storage device such as a hard drive, an erasable programmable read-only memory (EPROM), and/or the like. The memory 120 can store information that can be accessed by the processor 110. For instance, the memory 120 (e.g. one or more non-transitory computer-readable storage mediums, memory devices) can include computer-readable instructions (not shown) that can be executed by one or more processors. The computer-readable instructions can be software written in any suitable programming language or can be implemented in hardware. Additionally, or alternatively, the computer-readable instructions can be executed in logically and/or virtually separate threads on one or more processors. For example, the memory 120 can store instructions (not shown) that when executed by one or more processors (e.g. processor 110) cause the one or more processors to perform operations such as any of the operations and functions for which processing system 100 is configured, as described herein. In addition, or alternatively, the memory 120 can store data (not shown) that can be obtained, received, accessed, written, manipulated, created, and/or stored. In some implementations, the processing system 100 can obtain from and/or store data in one or more memory device(s) that are remote from the processing system 100. The memory 120 can store data regarding the locations of the sensors 230-1 to 230-10 within the sensor array 230.

Figure 2:
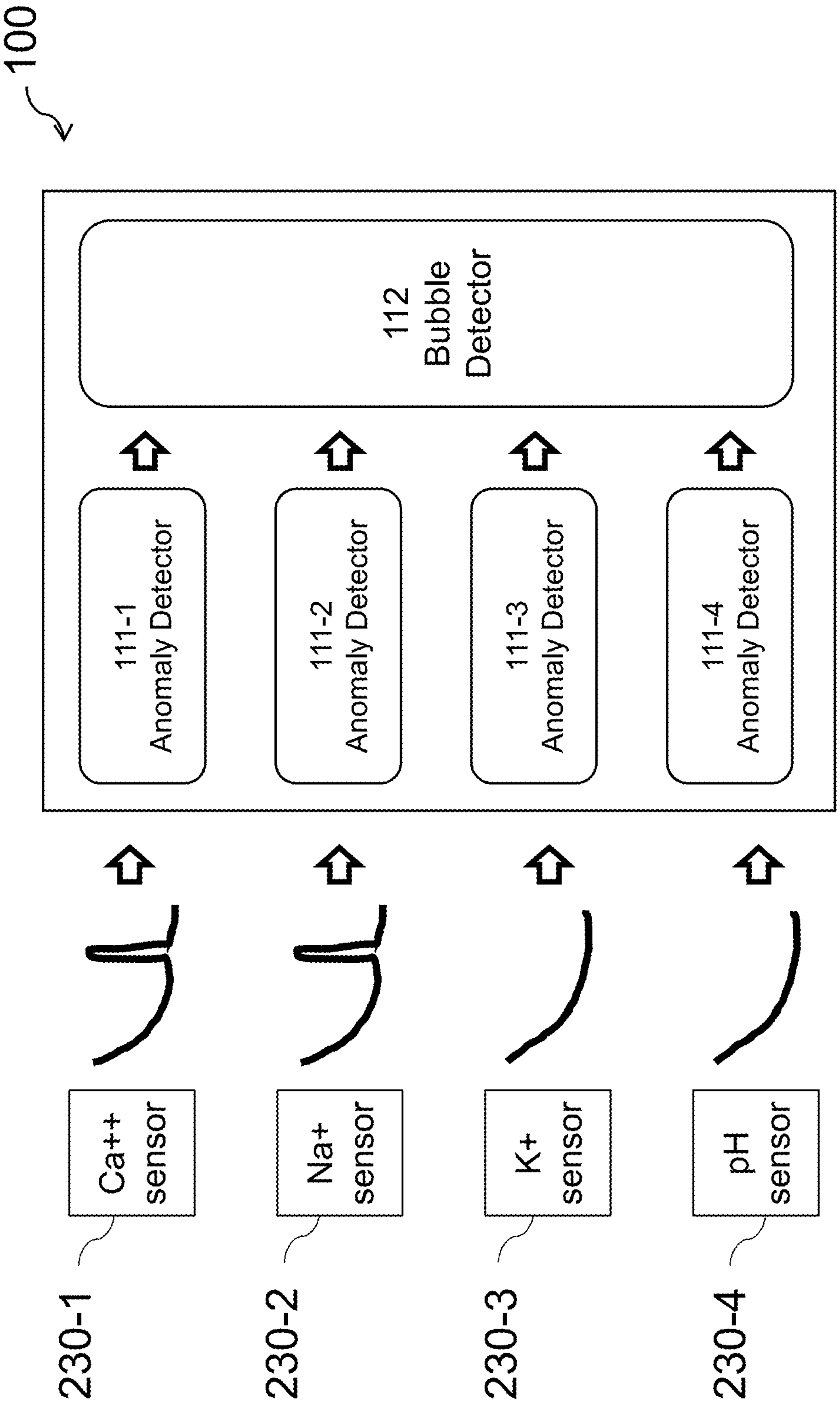
FIG. 2 shows an example of processing performed on readings taken from a plurality of sensors.

FIG. 2 shows an example of the processing carried out by the processing system 100. In the present example, processing system 100 receives readings from four different sensors: a calcium ion sensor 230-1, a sodium ion sensor 230-2, a potassium ion sensor 230-3 and a pH sensor 230-4. This is only for the purposes of illustration, and the processing may be applied to any or all of the sensors 230-1 to 230-10 shown in FIG. 1.

The processing system 100 includes anomaly detectors, 111-1, 111-2, 111-3 and 111-4, each of which receives readings from a respective sensor of the sensors 230-1, 230-2, 230-3 and 230-4 and analyses the readings to detect anomalies in the readings. The anomaly detectors 111 may operate in parallel or serially. In some examples, in addition to determining the presence of an anomalous reading, the anomaly detector may determine a probability that the reading is anomalous.

In the present example, the anomaly detectors are software modules executed in parallel by a single processor (e.g. the processor 110). In other examples, the processing system 100 may include multiple processors, and each anomaly detector 111 may be executed by a corresponding processor.

Each anomaly detector 111 may continuously analyse training windows which are time windows containing a series of readings. The length of the training windows can be chosen based on the variability of the data, i.e. if the readings are very variable a relatively short training window can be used. The training windows may be between 1 minute and 6 minutes long, for example 3 minutes or 5 minutes long.

Based on analysis of the training windows, each anomaly detector 111 can build up a statistical profile of its respective sensor in order to determine confidence envelopes or bands for readings expected from the sensor in a prediction time window containing a series of readings. The length of the prediction windows can be chosen based on the length of the training windows. For example, a 1 minute prediction window may be used for a training window of 3 minutes, or a 2 minute prediction window may be used for a training window of 5 minutes. If a reading falls outside the determined confidence envelope or band, the anomaly detector 111 will flag the reading as an anomalous reading.

In the present example, each anomaly detector 111 uses a time-series based predictor to detect the presence of anomalous readings. A description of such a time-series based predictor is set out in previous application number PCT/EP2022/065301, the contents of which are hereby incorporated by reference and are briefly summarised below.

A time-series predictor may be trained on the observations within a training window. Once trained, the time-series predictor forecasts, or estimates, an observation value at a future time point based on a previous window of observations. Alternatively, the time-series predictor forecasts a plurality of observation values at future time points based on the previous window of observations. The forecasted observation values fall within an observation window.

A confidence envelope may be calculated from the error rate of the predictor and corresponds to the uncertainty that the predictor has in relation to the predictions produced within the prediction window. The confidence envelope may include an upper envelope corresponding to the upper region, or threshold, of the confidence envelope, and a lower envelope corresponding to the lower region, or threshold, of the confidence envelope. In some examples, the confidence envelope corresponds to a confidence interval having a fixed upper and lower envelope across the prediction window. In alternative examples, the confidence envelope corresponds to a confidence band having upper and lower envelopes which vary across the prediction window.

Confidence level anomaly detection techniques utilize confidence envelopes to detect outliers within a time-series signal. The readings may be compared to the confidence envelope to identify anomalous readings which lie outside the confidence envelope. The anomalous readings are considered to be anomalous because they lie outside of the observed error margins, or uncertainty, of the predictor. In contrast, a non-outlier portion of the readings may have a high-level of variability (e.g. due to noise) but lies within the confidence envelope, and thus within the observed error margins of the predictor.

In the present example, the time-series based predictor corresponds to an artificial neural network or deep learning model. Examples of such models include long short-term memory (LSTM) networks, gated recurrent units (GRU), convolutional neural networks (CNNs), and the like. Any other suitable technique for detecting anomalous readings may be used, such as linear regression or mean squared error analysis.

In some examples (e.g. when the sensors are implemented as ISEs), the sensors may be subject to drift over time. In such examples, each anomaly detector 111 may learn the drift of its respective sensor and take this drift into account when detecting anomalous readings.

If an anomaly detector 111 detects an anomalous reading, the anomaly detector outputs metadata associated with the readings (e.g. the probability of the reading being anomalous and/or a time associated with the anomalous reading) to a bubble detector 112.

In some examples, each anomaly detector 111 may be configured to classify the anomaly causing the anomalous reading. For, example, an anomaly detector may determine that the readings switching between a typical value and a maximum or minimum value is indicative of a bubble being close to the respective sensor. In such examples, the classification may be outputted to the bubble detector 112 as part of the associated data.

In the present example, the bubble detector 112 is a software module which is executed by the same processor as the anomaly detectors. In other examples, the bubble detector 112 may be executed by a different processor from the processor executing the anomaly detectors 111.

The bubble detector 112 uses the data output by the anomaly detectors 111, and optionally the anomalous readings identified by the anomaly detectors 111, to determine whether one or more bubbles are present in the fluid channel 250 of the sensor system 200. In the present example, the bubble detector 112 uses an artificial neural network to analyse the data output by the anomaly detectors. However, the bubble detector 112 is not limited to using such a processing method, and may use other methods, such as logic.

In response to determining that one or more bubbles are present in the fluid channel 250, the bubble detector 112 can generate a control signal which is transmitted to the sensor system 200 to cause a pre-determined action, for example, causing fluid be flushed through the fluid channel 250 (by means of the pump 240).

Figure 3:
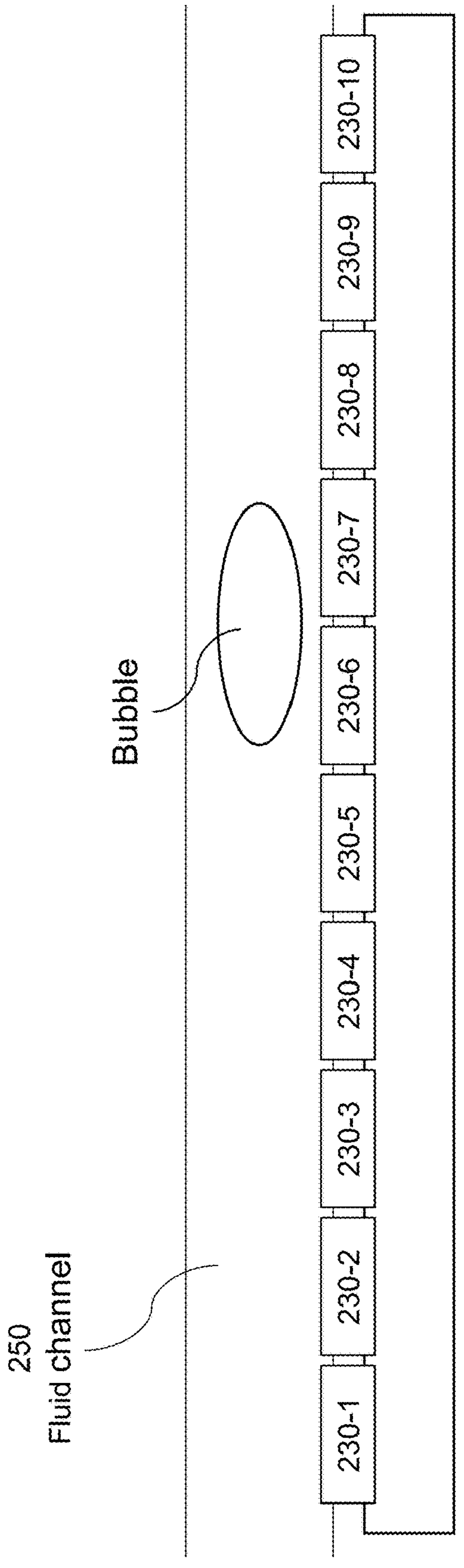
FIG. 3 shows an example of a bubble within a fluid channel.

FIG. 3 shows an example of a situation where a bubble is present at a fixed location in a fluid channel 250. In this example, the bubble is adjacent to sixth sensor 230-6 and seventh sensor 230-7, which are next to each other in the fluid channel. This will lead to the sixth sensor 230-6 and the seventh sensor 230-7 generating anomalous readings which will be detected by the corresponding anomaly detectors of the processing system 100. The anomalous readings will occur at similar times. Based on the fact that anomalous readings are identified in readings from two sensors that are adjacent to each other along the fluid channel 250, and the anomalies occurred at similar times (e.g. within a few milliseconds of each other), the bubble detector 112 receiving these anomalous readings may determine that a bubble is present in the fluid channel 250 and specifically is adjacent to the sixth sensor 230-6 and the seventh sensor 230-7.

Figure 4:
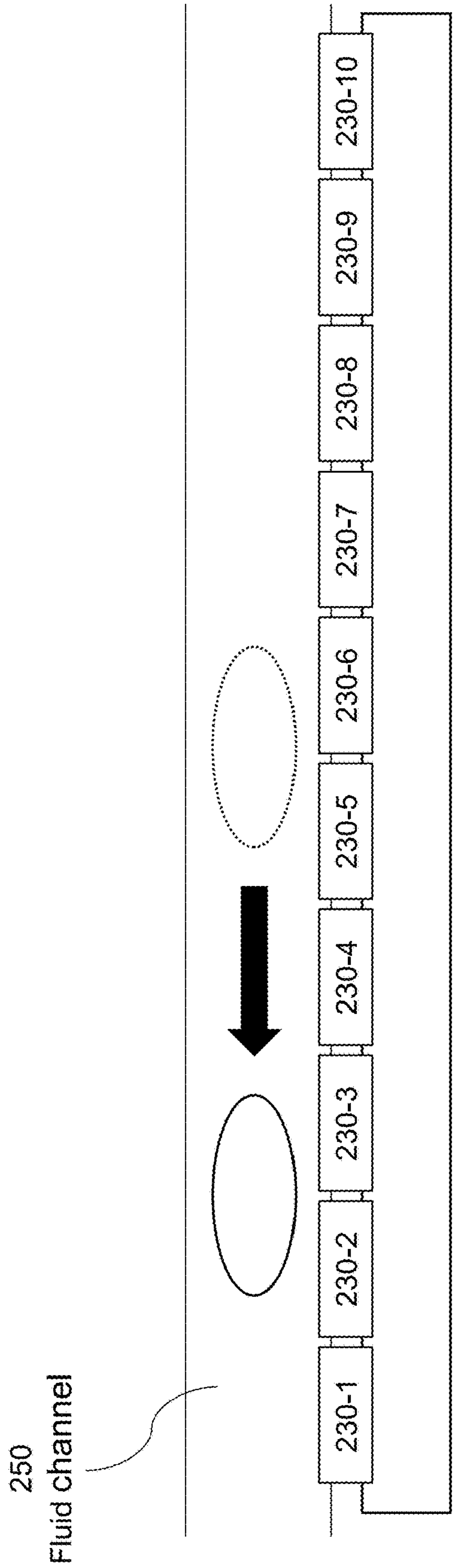
FIG. 4 shows another example of a bubble within a fluid channel.

FIG. 4 shows an example of a situation where a bubble moves along a fluid channel 250. In some cases, the fluid in the fluid channel 250 will be flowing through the channel, in this example from right to left as represented in the figure. In other scenarios, fluid will be pumped into the channel in a particular direction (in this example right to left in the figure) and will be notionally static during the sensor readings, but in practice residual currents are likely to exist in the fluid, flowing in the direction in which the fluid is pumped into the channel. Thus, in this example, sensors to the right of the representation of FIG. 4 are regarded as "upstream" (230-10 being most upstream) and sensors to the left are regarded as "downstream" (230-1 being most downstream).

In this example, a bubble is initially adjacent to fifth sensor 230-5 and sixth sensor 230-6, and subsequently moves along the fluid channel 250 to a location adjacent to second sensor 230-2 and third sensor 230-3. This will lead to the fifth sensor 230-5 and the sixth sensor 230-6 generating anomalous readings at a first time, and the second sensor 230-2 and the third sensor 230-3 generating anomalous readings at a second time which is later than the first time. The bubble detector 112 can determine from the data received from the anomaly detectors 111 that the anomalous readings occurred at the first time for the upstream sensors 230-5 and 230-6, and at the second time for downstream sensors 230-2 and 230-3. Based on the fact that the anomalous readings for the second and third sensors 230-2 and 230-3 occurred later than the anomalous readings for fifth and sixth sensors 230-5 and 230-6, the bubble detector can determine that a bubble has moved along the fluid channel from a location adjacent to the fifth and sixth sensors 230-5 and 230-6 to a location adjacent to the second and third sensors 230-2 and 230-3. The bubble detector 112 may determine whether the anomalous readings for the second and third sensors 230-2 and 230 3 occurred a predetermined time (e.g. 3 seconds to 5 seconds) after the anomalous readings for the fifth and sixth sensors 230-5 and 230-6, and if so can determine that a bubble has moved along the fluid channel from a location adjacent to the fifth and sixth sensors 230-5 and 230-6 to a location adjacent to the second and third sensors 230-2 and 230-3.

Figure 5:
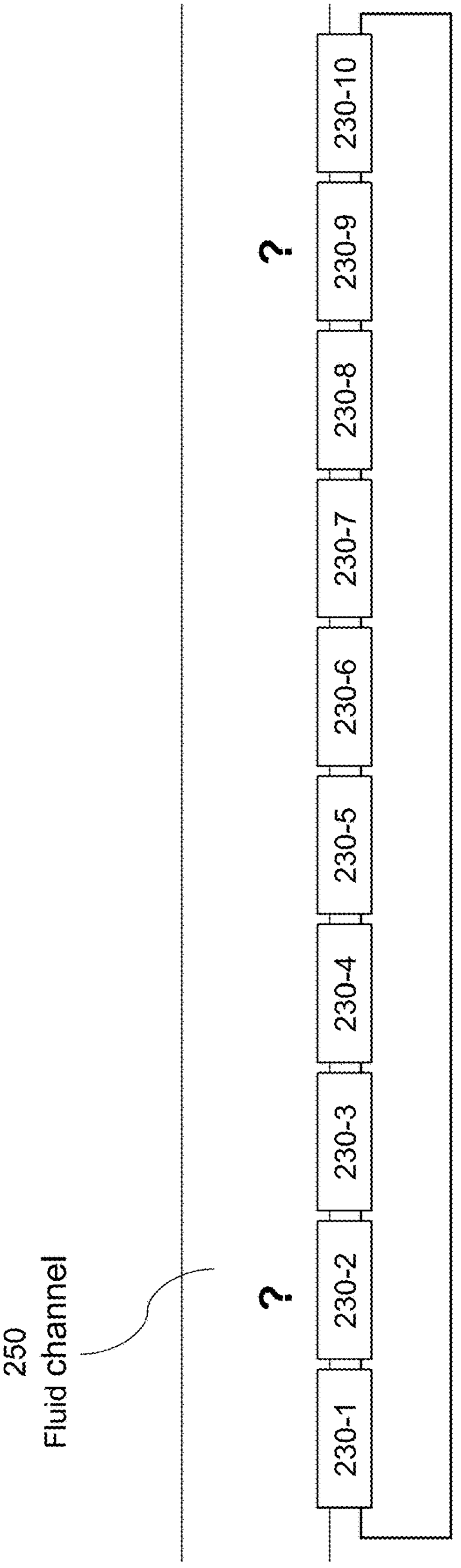
FIG. 5 shows another example of sensors producing anomalous readings.

FIG. 5 shows an example of a situation where second sensor 230-2 and ninth sensor 230-9 are both producing anomalous readings at the same time. In this situation it may be difficult to determine whether the anomalous readings are caused by separate bubbles adjacent to the second sensor 230-2 and the ninth sensor 230-9, or whether the anomalous readings are caused by sensor errors at the second and ninth sensors 230-2, 230-9. To address this, the processing system 100 can send a control signal to the pump 240 of the sensor system 200 to pump a small amount of fluid (e.g. 10% to 30% of the total volume of the fluid channel) through the fluid channel. This will shift the fluid slightly and cause it to "oscillate" within the fluid channel. If a bubble is present at the second sensor 230-2 and/or the ninth sensor 230-9, this shift should move the bubble(s) and cause a change in the anomalous readings (e.g. one or both of the anomalous readings may disappear). Based on this change, the processing system 100 can determine that the initial anomalous readings were caused by bubbles adjacent to the second sensor 230-2 and/or the ninth sensor 230-9. However, if no change in the anomalous readings is detected then it likely that at least the second and ninth sensors 230-2 and 230-9 have failed.

FIGS. 6A and 6B show an example sensor system according to an aspect of the present disclosure.

FIGS. 6A and 6B show a sensor system 200 comprising a sensor array 230 including a plurality of sensors (not shown). A first fluid channel 250 passes through and over the sensor array 230. The sensor system 200 also includes a reservoir 260 for calibration fluid and a valve 270. A second fluid channel 251 connects the reservoir 260 and the valve 270. The first fluid channel 250 passes through and over the sensor array 230 from the valve 270. A fluid inlet 280 and a fluid outlet 281 are both connected to the valve 270.

In the present example, the sensors of the sensor array 230 are polymer-based ISEs. As is known, an ISE provides spot monitoring by converting the activity of an ion dissolved in a solution to electrical potential. ISEs are widely used within the fields of medicine, biology, and analytical chemistry. Typical applications include using an ISE in biomedical devices to measure the concentration of calcium, potassium, and sodium in bodily fluids such as blood, and using an ISE for pollution monitoring by measuring the concentration of fluorine, copernicium, etc. in water. In the present example, the ISEs include ISEs configured to measure calcium, potassium and sodium ion concentrations, and pH.

Figure 6:
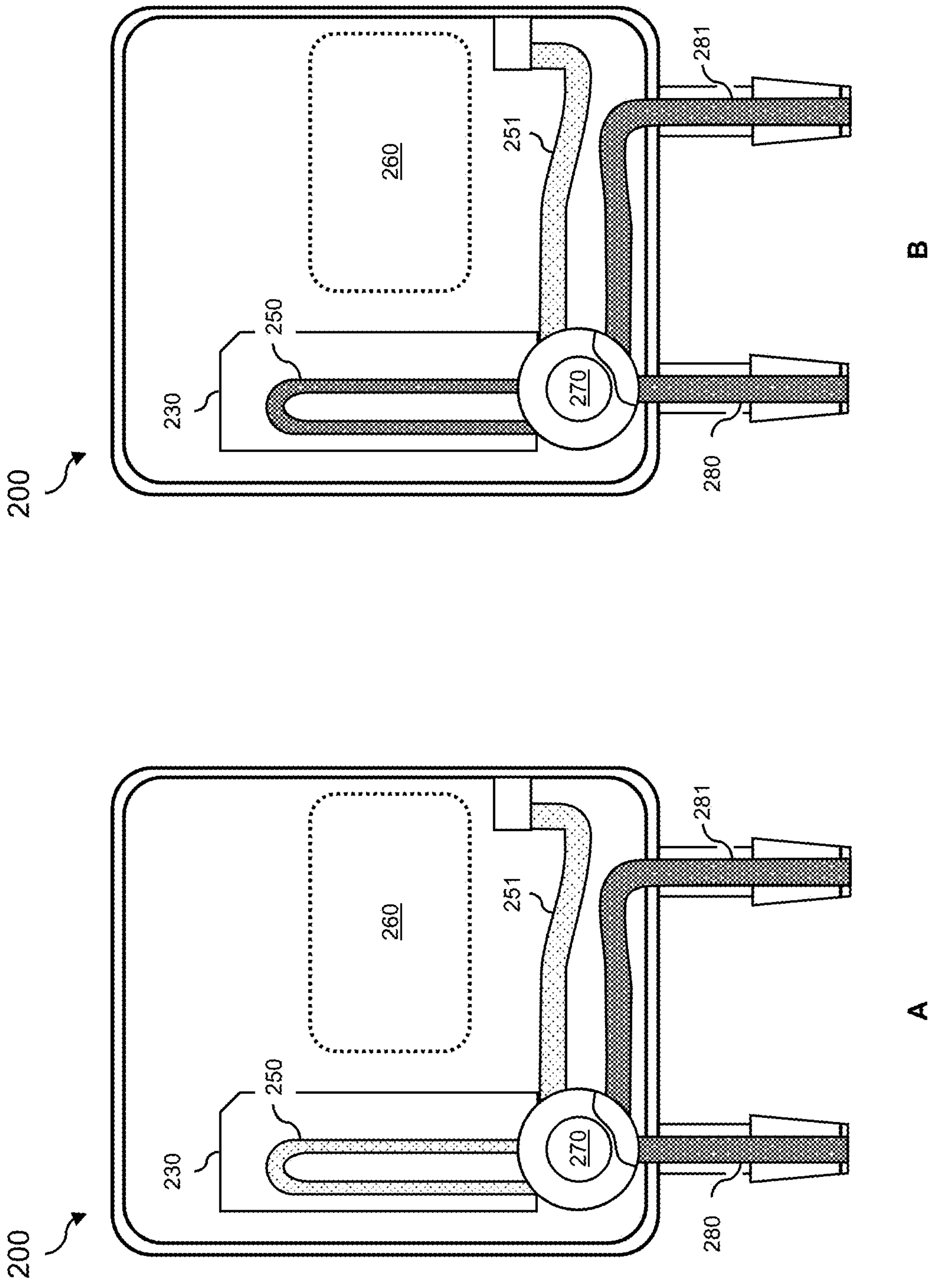
FIG. 6 shows an example of a sensor system according to the present disclosure.

In use, the sensor array 230 is typically "flushed" with the calibration fluid before being exposed to a sample fluid (e.g. blood) from which measurements are to be taken by the sensors. The calibration fluid flows from the reservoir 260 through the second fluid channel 251 to the valve 270 and then into the first fluid channel 250 where it remains for a period of time for sensor calibration. Subsequently, the calibration fluid flows from the valve 270 through the fluid outlet 281 to be further disposed of (e.g. flows to waste). Once sensor calibration is complete, the sample fluid (e.g. blood) flows from an external source (for example, a container holding the sample fluid, or a human/animal from which the sample is being drawn, neither of which are shown in FIG. 6) through the fluid inlet 280 to the valve 270 and from the valve 270 through the fluid outlet 281 to be further disposed of (e.g. flows to waste) or to be returned to the external source.

The valve 270 is controlled by an external controller (not shown) such as a computing system (e.g. the processing system described herein) or other external device. Configuration settings of the valve 270 are adjusted by means of the external controller. Specifically, commands are sent to the sensor system 200 to control actuation of the value 270.

In a first mode of operation (FIG. 6A), the valve 270 is configured to allow the calibration fluid to flow from the reservoir 260 through the second fluid channel 251 to the first fluid channel 250 in order to fill the first fluid channel 250 with calibration fluid. Once the first fluid channel 250 is filled, the valve 270 may be controlled to stop further calibration fluid being pumped into the first fluid channel 250, which is the state represented in FIG. 6A. The sensors of the sensor array 230 may then take reference measurements from the calibration fluid held in the first fluid channel 250.

In a second mode of operation (FIG. 6B), the valve 270 is configured to allow the sample fluid to flow from the external source (not shown) through the fluid inlet 280 to the first fluid channel 250. Prior to that, the calibration fluid may have been pumped out of the first fluid channel 250, or the flow of the sample fluid into the first fluid channel 250 may push the calibration fluid out. Once the first fluid channel 250 is filled with sample fluid, the value 270 may be controlled to stop further sample fluid being pumped into the first fluid channel 250, which is the state represented in FIG. 6B. The sensors of the sensor array 230 then take measurements from the sample fluid held in the first fluid channel 250. After completion of the sample measurements, the value 270 may be controlled to allow the sample fluid to passes from the first fluid channel 250 to the fluid outlet 281.

The sensors respond differently to the two fluids. The response of a given sensor is measured as a voltage developed between the inside and the outside of the ion sensitive membrane of the sensor. The time-series signal of the change in voltage received from a sensor over time will capture the transition of the sensor from measuring the calibration fluid to measuring the sample fluid.

Bubbles within the fluid channels, particularly within the first fluid channel 250, will lead to anomalous readings being recorded by the sensors of the sensor array (with bubbles appearing as sharp "spikes" within the time-series signal). Such anomalies occurring during the calibration phase may lead to the sensor system 200 (specifically the sensor array 230) being incorrectly calibrated. For example, the sensitivity of the sensors may be increased or decreased by the external controller (e.g. the processing system) during the calibration phase as a result of anomalous readings being incorrectly identified as true readings. This results in inaccurate measurements being taken during the measurement phase thus inhibiting operation of the sensor system 200. In addition, such anomalies occurring during the measurement phase may lead to the sensor system 200 reporting inaccurate readings from the sensors. The approaches described herein allow for bubbles to be identified and removed from the fluid channels, which ensures that the sensor measurements are more accurate.

Although the example sensor system described in relation to FIGS. 6A and 6B uses two different fluids, the techniques of the present disclosure may also be applied to sensor systems where only a single type of fluid is used.

Figure 7:
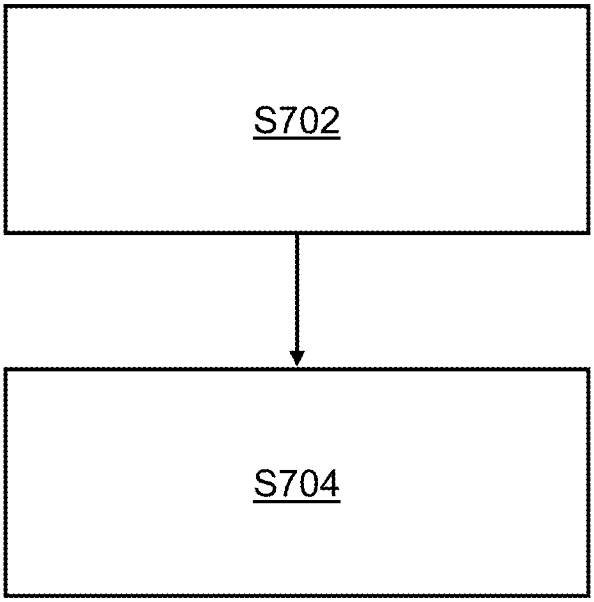
FIG. 7 shows an example of a method according to the present disclosure.

FIG. 7 shows an example of a method for determining whether one or more bubbles are present in a fluid channel of a sensor system.

The method includes receiving readings from each sensor of a plurality of sensors of the sensor system (S702); and determining, based on identifying an anomaly in the readings received from at least one of the plurality of sensors, whether one or more bubbles are present in a fluid channel of the sensor system (S704).

Although certain example processing systems have been described that can be used to implement the present disclosure, other computing systems can be used as well. Computing tasks discussed herein as being performed at and/or by one or more functional unit(s) can instead be performed remote from the respective system, or vice versa. Such configurations can be implemented without deviating from the scope of the present disclosure. For example, the bubble detector of the processing system may be remote from the other components of the processing system (e.g. the anomaly detectors) and may receive signals from the other components of the processing system via a wired or wireless connection (e.g. via the internet).

The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

Various further modifications to the above described examples, whether by way of addition, deletion or substitution, will be apparent to the skilled person to provide additional examples, any and all of which are intended to be encompassed by the appended claims.

There follows a list of numbered clauses defining particular examples of the disclosure. Where a numbered clause refers to an earlier numbered clause then those clauses may be considered in combination.

A1. A processing system for use with a sensor system comprising a plurality of sensors arranged along a fluid channel, the processing system comprising one or more processors configured to:

receive readings from each sensor of the plurality of sensors; and determine, based on identifying an anomaly in the readings received from at least one of the plurality of sensors, whether one or more bubbles are present in the fluid channel of the sensor system.

A2. A processing system according to clause A1, wherein the one or more processors are configured to determine whether one or more bubbles are present in the fluid channel by: determining that readings from a first sensor of the plurality of sensors comprise first anomalous readings;

determining that readings from a second sensor of the plurality of sensors comprise second anomalous readings; and determine, based on data associated with the first and second anomalous readings and location data associated with the first and second sensors, whether one or more bubbles are present in the fluid channel of the sensor system.

A3. A processing system according to clause A2, wherein the data associated with the first and second anomalous readings comprise a first time associated with the first anomalous readings and a second time associated with the second anomalous readings, and wherein the location data associated with the first and second sensors comprise relative locations of the first sensors and the second sensors along the fluid channel.

A4. A processing system according to clause A3, wherein the one or more processors are configured to determine, based on the first time being substantially the same as the second time and the first sensor being adjacent to the second sensor, that a bubble is adjacent to the first sensors and the second sensors.

A5. A processing system according to clause A3, wherein the one or more processors are configured to determine, based on the second time being after the first time and the second sensor being downstream from the first sensor along the fluid channel, that a bubble has moved along the fluid channel from a location adjacent to the first sensor to a location adjacent to the second sensor.

A6. A processing system according to clause A5, wherein the one or more processors are configured to determine, based on the second time being later than the first time by a predetermined time interval and the second sensor being downstream from the first sensor along the fluid channel, that the bubble has moved along the fluid channel from the location adjacent to the first sensor to the location adjacent to the second sensor.

A7. A processing system according to any one of clauses A1 to A6, wherein the one or more processors are configured to, in response to determining that one or more bubbles are present in the fluid channel, perform a predetermined action.

A8. A processing system according to clause A7, wherein the predetermined action comprises transmitting a control signal to the sensor system to cause fluid to be flushed through the fluid channel.

A9. A processing system according to clause A8, wherein the one or more processors are configured to:

determine an estimate of the locations of the one or more bubbles in the fluid channel, determine, based on the estimate of the locations, an amount of the fluid to be flushed through the fluid channel, and transmit the control signal to the sensor system to cause the determined amount of the fluid to be flushed through the fluid channel.

A10. A processing system according to any one of clauses A1 to A9, wherein the one or more processors are configured to identify the anomaly in the readings received from the at least one sensor by using a statistical profile of the at least one sensor.

A11. A processing system according to clause A10, wherein the one or more processors are configured to determine a statistical profile for each sensor of the plurality of sensors by analysing historical readings of each sensor.

A12. A processing system according to clause A11, wherein the one or more processors are configured to determine the statistical profile for each sensor by analysing the historical readings of each sensor using a neural network or deep learning model.

B1. A system comprising:

a sensor system comprising:

a fluid channel; and a plurality of sensors arranged along the fluid channel; and a processing system comprising:

a plurality of anomaly detectors, each of the anomaly detectors being configured to receive readings from a respective sensor of the plurality of sensors and output a signal indicative of whether an anomaly is present in the readings; and a bubble detector configured to receive the signals output from the anomaly detectors and determine, based on the signals, whether anomalies in the readings are caused by one or more bubbles in the fluid channel.

B2. A system according to clause B1, wherein the sensor system comprises a pump configured to pump a fluid into the fluid channel.

B3. A system according to clause B2, wherein the bubble detector is configured to, in response to determining that the anomalies in the readings are caused by one or more bubbles in the fluid channel, control the pump to pump further fluid into the fluid channel to remove the one or more bubbles from the fluid channel.

B4. A system according to clause B3, wherein the bubble detector is configured to:

determine, based on an estimate of the locations of the one or more bubbles in the fluid channel, an amount of the further fluid to be pumped into the fluid channel; and control the pump to pump the determined amount of the further fluid into the fluid channel.

B5. A system according to clause B2, wherein the bubble detector is configured to:

based on a first set of signals output from the anomaly detectors being indicative of anomalies being present in a first set of readings from the sensors, control the pump to pump further fluid into the fluid channel;

receive a second set of signals output from the anomaly detectors after the further fluid has been pumped into the fluid channel, the second set of signals being based on a second set of readings from the sensors; and based on the second set of signals being indicative of no anomalies being present in the second set of readings, determine that that the anomalies present in the first set of readings are caused by one or more bubbles in the fluid channel.

B6. A system according to any one of clauses B1 to B5, wherein each sensor of the plurality of sensors is configured to measure a respective ion concentration associated with a fluid in the fluid channel.

B7. A system according to clause B6, wherein at least one of the plurality of sensors is an ion selective electrode.

B8. A system according to clause B6 or B7, wherein the plurality of sensors comprises one or more of: a calcium ion sensor, a potassium ion sensor, a sodium ion sensor, and a pH sensor.

C1. A computer readable medium comprising instructions which, when executed by one or more processors, cause the one or more processors to:

receive readings from each sensor of a plurality of sensors arranged along a fluid channel of a sensor system; and determine, based on identifying an anomaly in the readings received from at least one of the plurality of sensors, whether one or more bubbles are present in the fluid channel of the sensor system.

D1. A method of processing data from a plurality of sensors arranged along a fluid channel of a sensor system, the method comprising:

receiving readings from each sensor of the plurality of sensors; and determining, based on identifying an anomaly in the readings received from at least one of the plurality of sensors, whether one or more bubbles are present in the fluid channel of the sensor system.

The invention claimed is:

1. A processing system for use with a sensor system comprising a plurality of sensors arranged along a fluid channel, the processing system comprising one or more processors configured to:

receive readings from each sensor of the plurality of sensors, wherein each sensor is configured to detect a different chemical characteristic of a fluid present in the fluid channel;

identify an anomaly in the readings received from at least one of the plurality of sensors based on comparing the readings from the at least one of the plurality of sensors to forecasted values based on a time-series predictor specific to the chemical characteristic for the at least one of the plurality of sensors;

determine that readings from a first sensor of the plurality of sensors comprise first anomalous readings with a first time associated with the first anomalous readings;

determine that readings from a second sensor of the plurality of sensors comprise second anomalous readings with a second time associated with the first anomalous readings;

determine, based on data associated with the first and second anomalous readings and location data associated with the first and second sensors, whether one or more bubbles are present in the fluid channel of the sensor system, wherein the location data associated with the first and second sensors comprise relative locations of the first sensors and the second sensors along the fluid channel;

determine, based on the first time being substantially same as the second time and the first sensor being adjacent to the second sensor, that a bubble is adjacent to the first sensors and the second sensors; and transmit a control signal to a pump to cause fluid to be flushed through the fluid channel in response to determining that one or more bubbles are present in the fluid channel.

2. A processing system according to claim 1, wherein the one or more processors are configured to determine, based on the second time being after the first time and the second sensor being downstream from the first sensor along the fluid channel, that a bubble has moved along the fluid channel from a location adjacent to the first sensor to a location adjacent to the second sensor.

3. A processing system according to claim 2, wherein the one or more processors are configured to determine, based on the second time being later than the first time by a predetermined time interval and the second sensor being downstream from the first sensor along the fluid channel, that the bubble has moved along the fluid channel from the location adjacent to the first sensor to the location adjacent to the second sensor.

4. A processing system according to claim 1, wherein the one or more processors are configured to:

determine an estimate of locations of the one or more bubbles in the fluid channel, determine, based on the estimate of the locations, an amount of the fluid to be flushed through the fluid channel, and transmit the control signal to the pump to cause the determined amount of the fluid to be flushed through the fluid channel.

5. A processing system according to claim 1, wherein the one or more processors are configured to identify the anomaly in the readings received from the at least one of the plurality of sensors by using a statistical profile of the at least one of the plurality of sensors.

6. A processing system according to claim 5, wherein the one or more processors are configured to determine a statistical profile for each sensor of the plurality of sensors by analysing historical readings of each sensor.

7. A processing system according to claim 6, wherein the one or more processors are configured to determine the statistical profile for each sensor by analysing the historical readings of each sensor using a neural network or deep learning model.

8. A processing system according to claim 1, further in combination with the sensor system comprising:

the fluid channel; and the plurality of sensors arranged along the fluid channel.

9. A processing system according to claim 8, wherein the sensor system comprises the pump configured to pump the fluid into the fluid channel.

10. A processing system according to claim 9, wherein the one or more processors are configured to, in response to determining that the anomaly in the readings is caused by one or more bubbles in the fluid channel, control the pump to pump further fluid into the fluid channel to remove the one or more bubbles from the fluid channel.

11. A processing system according to claim 10, wherein the one or more processors are configured to:

determine, based on an estimate of locations of the one or more bubbles in the fluid channel, an amount of the further fluid to be pumped into the fluid channel; and control the pump to pump the determined amount of the further fluid into the fluid channel.

12. A processing system according to claim 9, wherein the one or more processors are configured to:

based on a first set of signals output from the plurality of sensors being indicative of anomalies being present in a first set of readings from the plurality of sensors, control the pump to pump further fluid into the fluid channel;

receive a second set of signals output from the plurality of sensors after the further fluid has been pumped into the fluid channel, the second set of signals being based on a second set of readings from the plurality of sensors; and based on the second set of signals being indicative of no anomalies being present in the second set of readings, determine that that the anomalies present in the first set of readings are caused by the one or more bubbles in the fluid channel.

13. A processing system according to claim 8, wherein each sensor of the plurality of sensors is configured to measure a respective ion concentration associated with the fluid in the fluid channel.

14. A processing system according to claim 13, wherein at least one of the plurality of sensors is an ion selective electrode.

15. A processing system according to claim 13, wherein the plurality of sensors comprises one or more of:

a calcium ion sensor, a potassium ion sensor, a sodium ion sensor, and a pH sensor.

* * * * *